UNITED STATES PATENT OFFICE.

RICHARD SOLIS, OF NEW BRUNSWICK, NEW JERSEY.

IMPROVEMENT IN MANUFACTURE OF INDIA-RUBBER.

Specification forming part of Letters Patent No. 9,570, dated February 1, 1853.

*To all whom it may concern:*

Be it known that I, RICHARD SOLIS, of New Brunswick, in the county of Middlesex and State of New Jersey, have made a new and useful discovery; and I do hereby declare that the following is a full and exact description.

The nature of my invention is the art of remanufacturing what is commonly known and called "metallic vulcanized" or "insoluble" rubber.

Before my discovery and invention no mode was known whereby vulcanized rubber could be remanufactured for useful purposes, and as a consequence where articles of this kind of rubber had been worn in places the whole article has been thrown aside as useless.

I have discovered and reduced to successful practice a mode or plan to remanufacture the useless articles into new and useful ones.

I take vulcanized rubber, cut it into small pieces—say half an inch square, more or less, according to the article—and subject the same to mastication by any suitable machinery—such as millstones, Bogardus's patent universal mill, or the ordinary rubber-grinding mill operating with a compound rolling and slipping action, or a cylinder-masticator—by which means I grind and reduce the same to a powder, as near as may be, the exact degree of fineness not being material. I then take the ordinary india-rubber as imported and masticate the same until it is reduced to a paste. This may be accomplished either by softening the same with any of the well-known menstruum ordinarily used by the rubber-manufacturers—such as spirits of turpentine, coal-naphtha, coal-tar, &c.—or by the more recent useful modes of mastication by heat and friction. The ground vulcanized powder is then to be mixed and incorporated with it by the ordinary mulling or grinding mill until the same is rendered to a uniform pulp or mass, the exact quantity of each not being material for ordinary purposes. I find equal proportions of each to answer a good purpose. This is then ready to be spread or molded and submitted to the heating or vulcanizing process, and for many articles is useful and ready for making up into goods without the heating or vulcanizing process; but when a greater degree of elasticity or insolubility is required the two compounds before described may be mixed with any of the usual powders adapted by manufacturers—such as zinc-whiting, lamp-black, sulphur, &c.—and after being thoroughly incorporated by grinding or mixing the whole may be spread or molded and reduced to useful articles—such as shoes, car-springs, hose, belting, clothing, &c.—and then subjected to the action of heat in connection with steam or atmosphere. Goods made by this process will be much cheaper and in some respects better than those made wholly of new material.

I also find that a good fabric may be made by the mixture of equal parts, by weight, of the vulcanized with the native rubber and then dried or cured in the sun and air without artificial heat.

I therefore claim as my invention and desire to secure by Letters Patent—

The manufacture of india-rubber fabrics by the mixture of ground or powdered vulcanized rubber with the ordinary india-rubber of commerce.

RICHARD SOLIS.

Witnesses:
RALPH R. ROTH, Jr.,
JOHN HELM,
ALEXANDER C. McINTIRE.